US008543593B2

(12) United States Patent
Bennett

(10) Patent No.: US 8,543,593 B2
(45) Date of Patent: Sep. 24, 2013

(54) SYSTEM AND METHOD FOR AUTOMATING THE ASSEMBLY, PROCESSING AND DELIVERY OF DOCUMENTS

(75) Inventor: Rodney Bennett, Fresno, CA (US)

(73) Assignee: Data Control Corporation, Granite Bay, CA (US)

( * ) Notice: Subject to any disclaimer, the term of this patent is extended or adjusted under 35 U.S.C. 154(b) by 26 days.

(21) Appl. No.: 12/870,630

(22) Filed: Aug. 27, 2010

(65) Prior Publication Data

US 2011/0054951 A1 Mar. 3, 2011

Related U.S. Application Data

(63) Continuation of application No. 11/144,221, filed on Jun. 2, 2005, now Pat. No. 7,788,217, and a continuation of application No. 09/788,113, filed on Feb. 16, 2001, now abandoned.

(60) Provisional application No. 60/182,839, filed on Feb. 16, 2000.

(51) Int. Cl.
*G06F 7/04* (2006.01)
*G06F 17/30* (2006.01)

(52) U.S. Cl.
USPC .................... 707/769; 707/722; 707/758

(58) Field of Classification Search
USPC ............ 707/1, 3, 4, 102, 104.1, 999.001, 707/999.003, 999.004, 999.102, 999.104, 707/608, 999.107, 722, 758, 999.002; 705/4
See application file for complete search history.

(56) References Cited

U.S. PATENT DOCUMENTS

| | | | | |
|---|---|---|---|---|
| 6,810,383 | B1 * | 10/2004 | Loveland | 705/7.13 |
| 7,580,919 | B1 * | 8/2009 | Hannel et al. | 1/1 |
| 7,778,867 | B2 * | 8/2010 | Libman | 705/14.1 |
| 2004/0230566 | A1 * | 11/2004 | Balijepalli et al. | 707/3 |
| 2007/0038488 | A1 * | 2/2007 | Bauer et al. | 705/4 |
| 2011/0166893 | A1 * | 7/2011 | McConnell et al. | 705/4 |

* cited by examiner

*Primary Examiner* — Bruce Moser
(74) *Attorney, Agent, or Firm* — Patent Law Works LLP

(57) ABSTRACT

A system for automating the assembly, processing and delivery of documents includes a plurality of transport clients, a work queue, a scheduler, a plurality of rendering objects, a plurality of transport objects and a routing table. The transport clients are each responsible for acquisition of data necessary to generate the response. Once a work item is received from a transport client, it is added to the work queue. The scheduler manages the work queue including sending work items to an identified rendering object and thereafter to a transport client. Each of the rendering objects includes knowledge of the database as well as processes for extracting information from a database and applying rules on the extracted data. The scheduler assigns work items to be processed by the rendering objects, and once completed, the work items are returned to the scheduler for further processing by a transport object. The transport object uses the work items to create a document including how the document will appear, and also handles the routing of the document as specified in the information request created by the transport client. The transport objects work with the routing table for resource allocation, resource availability, and local or remote processing, and time of processing.

20 Claims, 15 Drawing Sheets

SYSTEM AND METHOD FOR AUTOMATING THE ASSEMBLY, PROCESSING AND DELIVERY OF DOCUMENTS

CROSS-REFERENCES TO RELATED APPLICATIONS

This application is a continuation of co-pending U.S. patent application Ser. No. 11/144,221, filed on Jun. 2, 2005 by Rodney Bennett, entitled "System and Method for Automating the Assembly, Processing and Delivery of Documents," which claims priority to U.S. patent application Ser. No. 09/788,113, filed on Feb. 16, 2001 by Rodney Bennett, entitled "System and Method for Automating the Assembly, Processing and Delivery of Documents," which claims priority under 35 U.S.C §119(e) to U.S. Provisional Application No. 60/182,839, filed on Feb. 16, 2000 by Rodney Bennett, entitled "A Method For Automating The Assembly Of Business Documents, Application Of Business Rule To Business Processes And The Delivery Of Business Documents," the subject matter of each of which is fully incorporated herein by reference.

BACKGROUND OF THE INVENTION

1. Field of the Invention

The present invention relates to systems and methods for acquiring, extracting, modifying and displaying data. The present invention also relates to systems and methods for modular application of processes to extracted or acquired data, and automated transfer and deliver of data. More specifically, the present invention relates to a new system and method automating the assembly, processing and delivery of documents. Still more particularly, the present invention relates to systems and methods with a modular approach to assembly, processing and delivery of documents.

2. Description of the Background Art

Many modern day interactions require the generation of responses to requests and the documentation of both the request and the response. For example, in virtually every business, a customer may send in a request for quotation on an item to be purchased, a service to be rendered or the cost of an insurance policy. A customer service representative, such as a salesperson, looks up information in an appropriate manner, formats a response to the customer and sends the response to the customer. Increasingly, the only source for the information requested by a customer, such as a price quotation, is a computer database. In this case, the computer must be searched, the data located, and delivered to the user. One particular problem with existing systems is that the interactions with the computer database by a human user are typically dictated by a programmer has written, and therefore lack flexibility because the program must be completely re-written to change an interaction or process.

In addition to the basic steps required to merely respond to a customer request for information, there are often a number of additional processes, approvals or other steps that must be performed in responding to such requests. For example, the process of getting base information from the computer system or database are typically supplemented with additional steps to enforce a company's policies, state or federal regulations, or other business rules the programmer has added to the process. For example, many customers receive special discounts based on volume, account payment status, length of relationship or other factors. Similarly, insurance rates may be based on previous losses suffered in insuring the prospective client, location of the client, size of the client, the type of business of the client, etc. Furthermore, many business allow a person quoting prices to a customer a specified amount of leeway in lowering or raising the price in response to their perception of the competitive situation on a quotation, to vary more than this amount may not be possible or require the approval of a supervisor in the management structure within the organization. The problem is further aggravated by the fact that there are thousands of such rules, and that they are constantly being changed due to changes in laws, company policies or other business conditions. Furthermore, the process is most problematic because the application of the rules to the extracted data is done by a person and is not automated.

A typical prior art procedure for providing documents or information in response to a request includes the following steps: A request is received from a customer for a quotation. A customer service agent looks up the data and applies the business rules to the quotation. The data is formatted for transmission to the customer; this may be done with a word processing system or another computer program. The quotation is printed for mailing or faxing, saved in a computer file for transmission as an email, or as appropriate for the required delivery. In the prior art, most all of these steps are done manually, and the only automated step is the search or look up for information in the database. This scenario has a number of shortcomings. First, the number of request for information that can be made are limited since customer service person must perform a number of the individual steps manually, and transition from moving from working with different systems. Second the business rules may not be applied or may applied or interpreted incorrectly due to human error or oversight.

One prior art approach to address these problems is creating database applications programs. These database application programs are special purpose computer programs that allow the easy generation of responses and the uniform application of business policies or rules. The business rules are built into the database applications programs. However, these database applications programs are inadequate because every time a business rules changes the program must be modified. This has caused large companies to employ large numbers of programmers whose sole task is the constant re-writing of database application programs in response to changes in the business rules. Second, if the underlying database containing the information changes the program also must be changed. Finally, if technology for delivering the document or response is changed, the program must be changed. Moreover, each change or modification frequently induces unintended side affects in the programs and therefore requires both expensive and extensive testing and re-testing.

Therefore, there is a need for a system and method for automating the assembly, processing and delivery of documents, in particular, in the context of receiving and responding to customer requests for information.

SUMMARY OF THE INVENTION

The present invention overcomes the deficiencies and limitations of the prior art by providing a system for automating the assembly, processing and delivery of documents. In particular, the present invention provides a novel system for acquiring data, for using the acquired data to extract additional data, for using the acquired data to select one or more processes and applying the process to the additional data, and for creating and delivering a document from the processed additional data.

In one embodiment, the present invention comprises a plurality of transport clients, a work queue, a scheduler, a plurality of rendering objects, a plurality of transport objects and a routing table. The transport clients are each responsible for acquisition of data necessary to generate the response. Each of the transport clients operates on a respective computing device and presents displays to the users, and collects data input by the user to the computing device. The collected data along with other information is used to create a work item. The work items are then sent the master scheduler. The master scheduler is responsible for processing work items and maintaining the work queue for storage of work items until they have been processed. Once a work item is received from a transport client, it is added to the work queue. The scheduler manages the work queue including sending work items to an identified rendering object and thereafter to a transport client. The present invention preferably includes a plurality of rendering objects. Each of the rendering objects includes knowledge of the database as well as processes for extracting information from a database and applying rules on the extracted data. The present invention preferably provides a plurality of such rending objects such that each information request of a given type may have an associated rendering object for responding to the information requests. This structure provides for use of a rendering object for a number of different types of information requests, and greatly simplifies modification of the system when transport clients, the database, the rules or transmission objects are changed. The scheduler assigns work items to be processed by the rendering objects, and once completed, the work items are returned to the scheduler for further processing by a transport object. The scheduler then sends a work item to one of the plurality of transport objects for the final processing. The transport objects are responsible for processing the work item including data returned by the rendering object. The transport object uses the work items to create a document including how the document will appear, and also handles the routing of the document as specified in the information request created by the transport client. The transport object coordinates the delivery of the created document use the transmission means specified. The transport objects work with the routing table for resource allocation, resource availability, local or remote processing, and time of processing.

The present invention also includes a number of novel methods including: a method for generating and delivering documents in response to an information request; a method for acquiring data; a method for extracting information; a method for applying one or more rules; a method for display and transmission of a document; and a method for processing work items.

BRIEF DESCRIPTION OF THE DRAWINGS

The invention is illustrated by way of example and not by way of limitation in the figures of the accompanying drawings in which like reference numerals refer to similar elements.

DETAILED DESCRIPTION OF THE PREFERRED EMBODIMENTS

Figure 1:
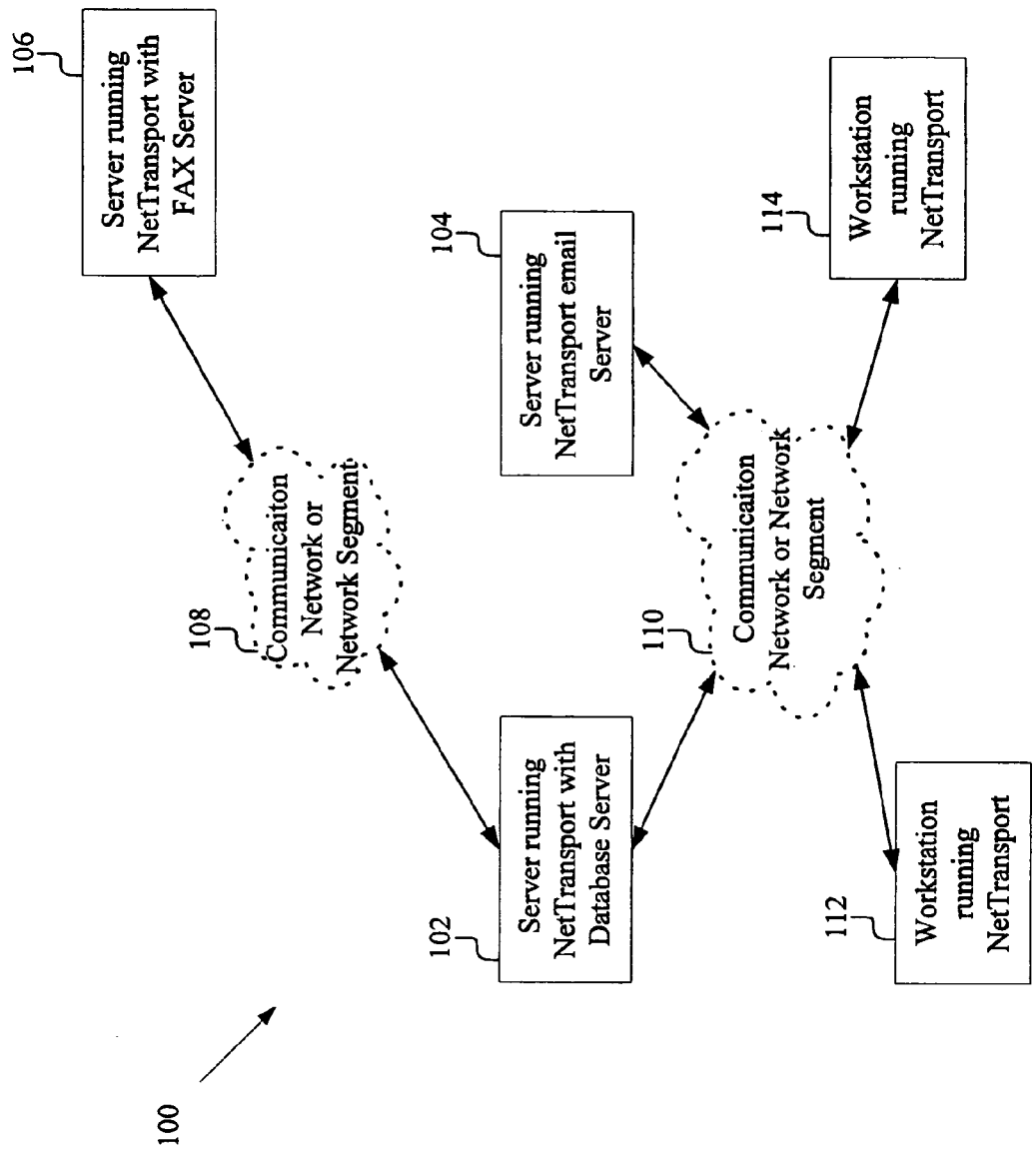
FIG. 1 is a block diagram of a preferred embodiment of a system in which the present invention operates.

A system and method for automating the assembly, processing and delivery of documents is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention is claimed below operating on or working in conjunction with an information system. Such an information system as claimed may be the entire information system as detailed below in the preferred embodiment or only portions of such a system. For example, the present invention can operate with an information system that need only be a browser in the simplest sense to input a data using a transport client. Similarly, the present invention could operate on a server that does not include a display device and an input device (keyboard and mouse type controller). Thus, the present invention is capable of operating with any information system from those with minimal functionality to those providing all the functionality disclosed herein.

A. Overview of the "NetTransport"

The present invention is directed to a novel system for acquiring data, for using the acquired data to extract additional data and apply business rules to produce result data, and for creating and delivering a document including the result data. The present invention includes a unique three-tier structure of transport clients 812, rendering objects 808, and transport objects 804 (See also FIG. 8). The transport clients 812 are each responsible for acquisition of data necessary to generate the response. The rendering objects 808 are for extracting information from a database and applying rules on the extracted data. The transport objects 804 are responsible for processing the work item including data returned by the rendering object. The interaction of these objects 804, 808 and clients 812 is coordinated by a master scheduler 806 and uses a work queue 810 in a novel manner as will be described below.

The present invention for automating the assembly, processing and delivery of documents will now be described in the context of a specific application for receiving a request for a quote on insurance and generating documents that respond to such a request. However, those skilled in the art will recognize that the present invention may be applied in a variety of other contexts where an information request is submitted and a response is provided. Therefore, the description of the present invention in the context of responding to requests for quotes on insurance is only by way of example.

Having just described an overview of the present invention, the systems and methods used to present the acquire data and prepare a response are described below. First, the system and its components will be described. Second, the various modules and their interaction will be described. Third, methods of operation of the present invention will be described. Finally, an exemplary user interfaces are described.

B. System

Referring now to FIG. 1, the context of a net transport system in accordance with the present invention is shown. The preferred embodiment for operation of the present invention is in conjunction with the transmission and retrieval of documents over a computer network such as the Internet. A simple system 100 is shown in FIG. 1 for simplicity and ease of understanding, although those skilled in the art will recognize that the net transport system is responsive to several clients 812. The user interacts and communicates using a client-computing device 102, 104, 106, 112, 114 that include a web browser. The client-computing device 102, 104, 106, 112, 114 is preferably a personal computer, but may also be a server, a mobile computing device, cellular telephone or any other computing device. The client-computing device 102, 104, 106, 112, 114 is coupled by a signal line 210 such as a modem and telephone line to the Internet 206. An exemplary embodiment of a system 100 including a plurality of computing devices 102, 104, 106, 112, 114 each including the net transport system is shown. The computing devices 102, 104, 106, 112, 114 are preferably coupled by a communication network or network segment 108 and 110. FIG. 1 is merely an example, and networks including the net transport system may be configured any number of ways as will be recognized by those skilled in the art.

The system 100 preferably includes one or more communication networks or network segments 108 and 110. The communication networks or network segments 108 and 110 may be of any suitable type and communication rate. The communication network 108 and 110 is preferably the Internet by way of example, but alternatively and the network 108 and 110 could be a WAN, a LAN, a VPN, an intranet or an extranet. The segments may be separate physically, or separate logical parts of one physical network. The networks may use any topology appropriate (e.g. ring, bus or star; both logical or physically 108 and 110).

Attached to the networks 108 and 110 are a plurality of computing devices 102, 104, 106, 112, 114. The computing devices 102, 104, 106, 112, 114 include workstations 112, 114 and servers 102, 104, 106. For example, the servers 102 and 106 are coupled to communication network 108 while servers 102, and 104, and workstations 112 and 114 are coupled to the second communication network 110. The servers 102, 104, 106 may also include various other functionality of a conventional type. For example, server 102 also operates as a database server; server 104 also operates as an e-mail server; and server 106 also operates as facsimile server. In one embodiment, system 100 is implemented as a free threaded (MTA) NT service residing on the IIS4.0 web server that services requests. Workstations include a client portion of the service that is implemented as a COM object that talks to the NT service. Each of the computing devices 102, 104, 106, 112, 114 also includes the net transport system as will be described in more detail below with reference to FIGS. 2 and 3.

With the exemplary system 100 shown in FIG. 1, a customer service person on workstation 112 may be running an application program that is a transport client 812 to which is supplied the necessary data to fill a request for a customer. Net Transport running on the workstation 112 receives the request and places it in its work queue 810. The master scheduler 806 on workstation 112 submits the request to the appropriate rendering object 808. The rendering object 808 executes an inquiry, if necessary, applies business rules, if any, and returns a response for the inquiry. The master scheduler 806 then submits the rendered response to the appropriate transport object 804 running on workstation 112. If the resources available to fill the transport request are local, the transmission takes place locally. If the destination is via email, the transport object 804 will send the request to the e-mail server 104 also Net Transport. If the resource required is a fax server the request is routed via the server 102 to server 106 to be filled. The user by any other server or workstation by a process that is part of net transport will be subject to any network security that exists. Therefore, if a request originating on workstation 114 does not have a sufficient level of privilege to access certain information on another server, such as the database server 102. The request placed in its work queue 810 and specifies the server 102 as the server on which the rendering object 808 is to be executed will be held and not executed.

Today, it is well understood by those skilled in the art that multiple computers can be used in the place of a single computer by applying the appropriate software, hardware, and communication protocols. For instance, data used by a computer often resides on a hard disk or other storage device that is located somewhere on the network to which the computer is connected and not within the computer enclosure itself. That data can be accessed using NFS, FTP, HTTP or one of many other remote file access protocols. Additionally, remote procedure calls (RPC) can execute software on remote processors not part of the local computer. In some cases, this remote data or remote procedure operation is transparent to the user of the computer and even to the application itself because the remote operation is executed through the underlying operating system as if it was a local operation.

It should be apparent to those skilled in the art that although the embodiment described in this invention refers to a single computer with local storage and processor, the data might be stored remotely in a manner that is transparent to the local computer user or the data might explicitly reside in a remote computer accessible over the network. In either case, the functionality of the invention is the same and both embodiments are recognized and considered as possible embodiments of this invention.

Figure 2:
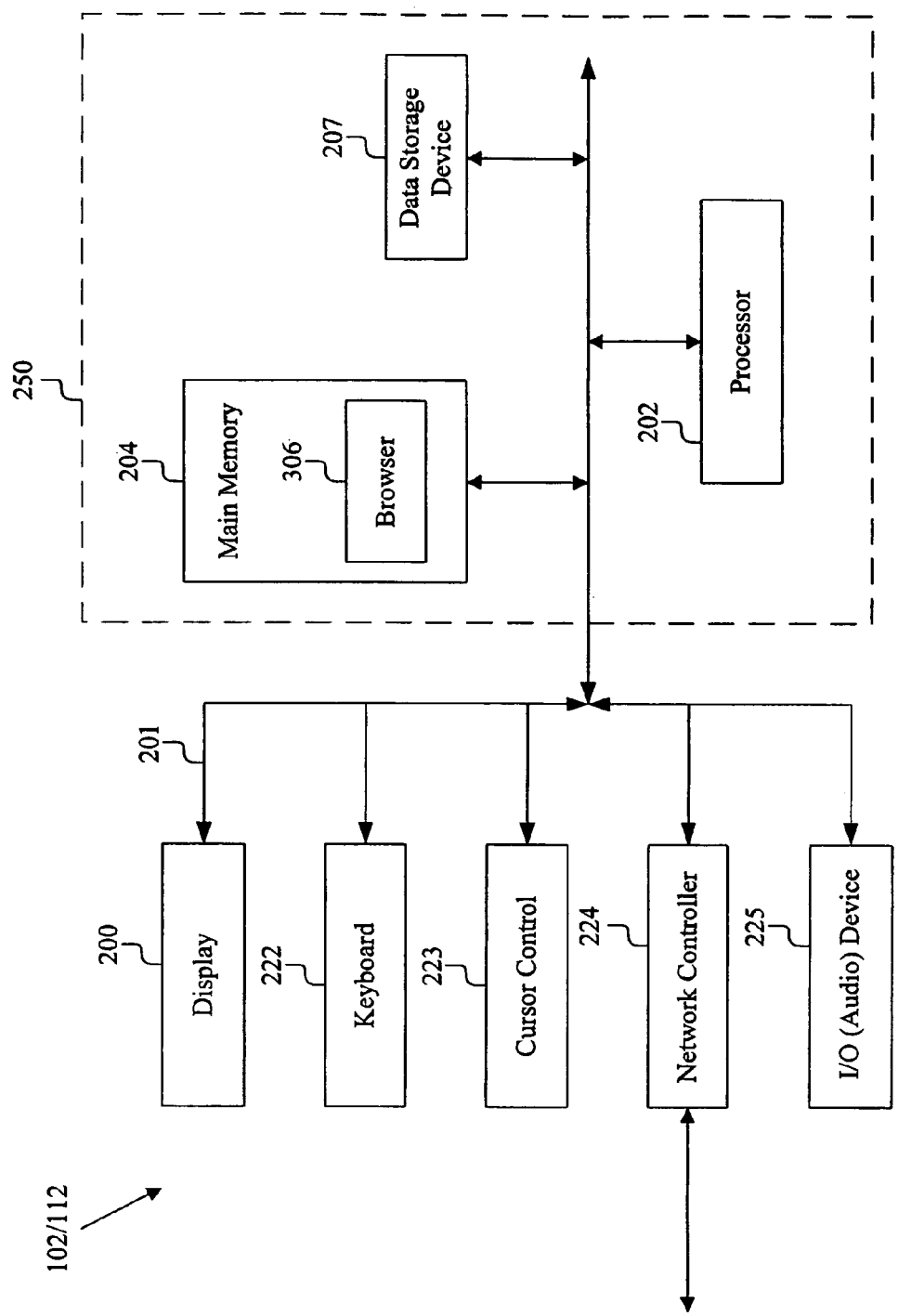
FIG. 2 is a block diagram of a preferred embodiment of a computing device including the present invention

Referring now to FIG. 2, a first embodiment for a client-computing device 102 or 112 including the net transport system is shown. The client-computing device 102 comprises a control unit 250 coupled to a display device 200, a keyboard 222, a cursor controller 223, a network controller 224 and an I/O device 225 by a bus 201.

Control unit 250 may comprise an arithmetic logic unit, a microprocessor, a general purpose computer, a personal digital assistant or some other information appliance equipped to provide electronic display signals to display device 200. In one embodiment, control unit 250 comprises a general purpose computer having a graphical user interface, which may be generated by, for example, a program written in Java running on top of an operating system like WINDOWS® or UNIX® based operating systems. In one embodiment, one or more application programs are executed by control unit 250 including, without limitation, word processing applications, electronic mail applications, spreadsheet applications, and web browser applications 306. The control unit 250 also has other conventional connections to other systems such as a network for distribution of files (media objects) using standard network protocols such as TCP/IP, http, and SMTP as will be understood to those skilled in the art and shown in detail in FIG. 2.

As shown in FIG. 2A, the control unit 250 includes a processor 202, main memory 204, and data storage device 207, all of which are communicatively coupled to system bus 201.

Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included.

Main memory 204 may store instructions and/or data that may be executed by processor 202. The instructions and/or data may comprise code for performing any and/or all of the techniques described herein. Main memory 204 may be a dynamic random access memory (DRAM) device, a static random access memory (SRAM) device, or some other memory device known in the art. The memory 204 preferably includes a web browser 230 of a conventional type that provides access to the Internet and processes HTML, XML or other mark up language to generated images on the display device 200. For example, the web browser 230 could be Netscape Navigator or Microsoft Internet Explorer.

Data storage device 207 stores data and instructions for processor 202 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 201 represents a shared bus for communicating information and data throughout control unit 250. System bus 201 may represent one or more buses including an industry standard architecture (ISA) bus, a peripheral component interconnect (PCI) bus, a universal serial bus (USB), or some other bus known in the art to provide similar functionality.

Additional components coupled to control unit 250 through system bus 201 include display device 200, keyboard 222, cursor control device 223, network controller 224 and input/output device 225. Display device 200 represents any device equipped to display electronic images and data as described herein. Display device 200 may be a cathode ray tube (CRT), liquid crystal display (LCD), or any other similarly equipped display device, screen, or monitor.

Keyboard 222 represents an alphanumeric input device coupled to control unit 250 to communicate information and command selections to processor 202. Cursor control 223 represents a user input device equipped to communicate positional data as well as command selections to processor 202. Cursor control 223 may include a mouse, a trackball, a stylus, a pen, a touch screen, cursor direction keys, or other mechanisms to cause movement of a cursor. Network controller 224 links control unit 250 to a network that may include multiple processing systems. The network of processing systems may comprise a local area network (LAN), a wide area network (WAN) (e.g., the Internet), and/or any other interconnected data path across which multiple devices may communicate.

One or more I/O devices 225 are coupled to the system bus 201. For example, the I/O device 225 may be an audio device equipped to receive audio input and transmit audio output. Audio input may be received through various devices including a microphone within audio device 225 and network controller 224. Similarly, audio output may originate from various devices including processor 202 and network controller 224. In one embodiment, audio device 225 is a general purpose; audio add-in/expansion card designed for use within a general purpose computer system. Optionally, audio device 225 may contain one or more analog-to-digital or digital-to-analog converters, and/or one or more digital signal processors to facilitate audio processing.

It should be apparent to one skilled in the art that control unit 250 may include more or less components than those shown in FIG. 2 without departing from the spirit and scope of the present invention. For example, control unit 250 may include additional memory, such as, for example, a first or second level cache, or one or more application specific integrated circuits (ASICs). Similarly, additional components may be coupled to control unit 250 including, for example, image scanning devices, digital still or video cameras, or other devices that may or may not be equipped to capture and/or download electronic data to control unit 250.

Figure 3:
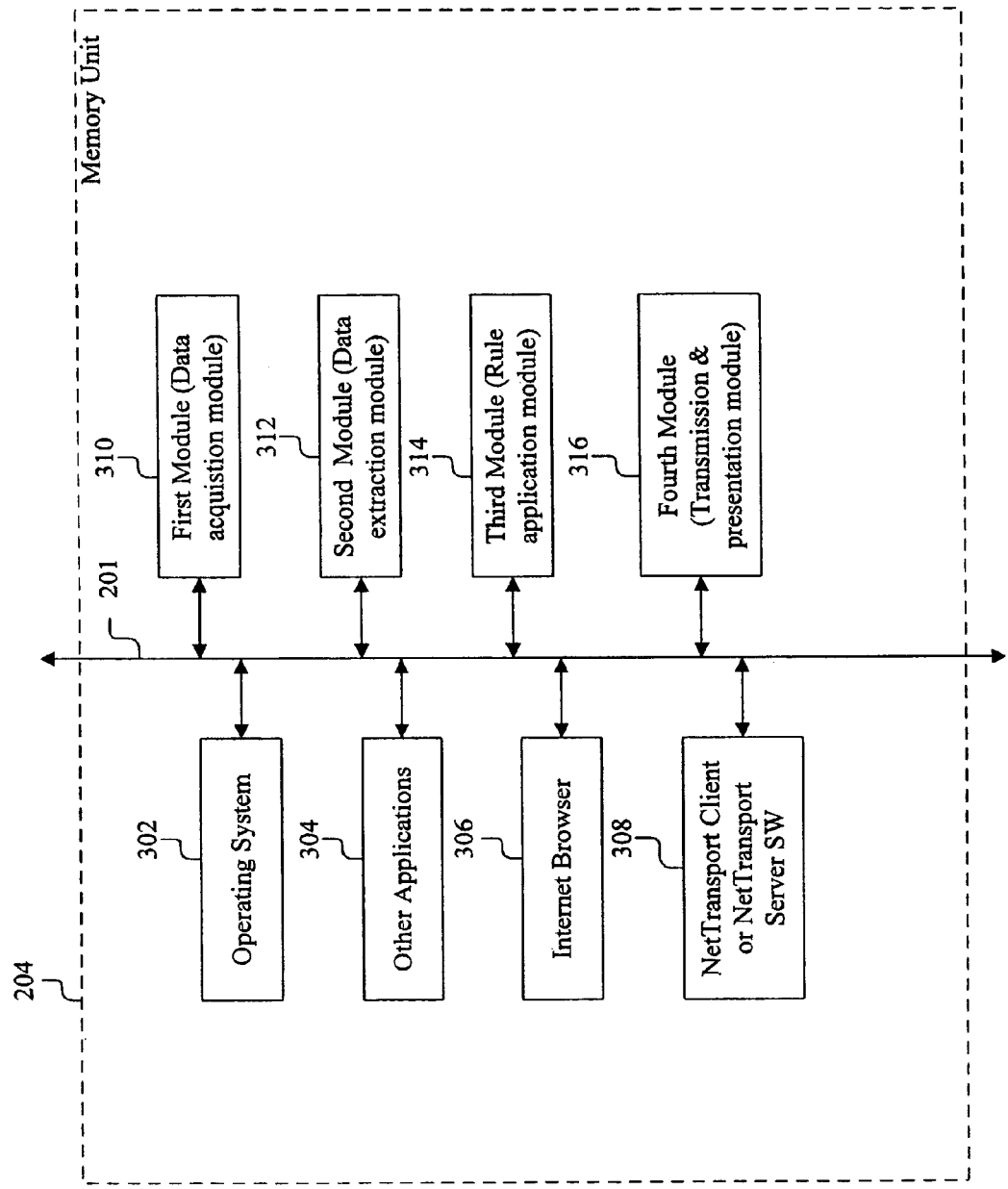
FIG. 3 is a block diagram of a preferred embodiment of the memory unit of the apparatus of FIG. 2.

Referring now to FIG. 3, the memory unit 204 is shown in more detail. In particular, the portions of the memory 204 needed for the processes of the present invention are shown and will now be described more specifically. As shown in FIG. 3, the memory unit 204 preferably comprises an operating system 302, other applications 304, a web browser 306, at least one net transport application 308, a first module 310 for data acquisition, a second module 312 for data extraction, a third module 314 for rule application, and a fourth module 316 for transmission and presentation of a response. As noted above, the memory unit 204 stores instructions and/or data that may be executed by processing unit 302. The instructions and/or data may comprise code for performing any and/or all of the techniques described herein. These modules 302-318 are coupled by bus 301 to the processing unit 302 for communication and cooperation to provide the system 100. Those skilled in the art will recognized that while the present invention will now be described as modules or portions of the memory unit 204 of a computer system, the modules or portions may also be stored in other media such as permanent data storage and may be distributed across a network having a plurality of different computers such as in a client/server environment. Furthermore, it should be understood that different embodiments of the present invention may include some but not all of the modules 302-318 of FIG. 3. For example, a client-computing device 112 or workstation may not include the second module 312 for data extraction and the third module 314 for rule application. Similarly, a server 102 may not include the first module 310 for data acquisition, but include the other modules. Those skilled in the art will recognize that the four modules 310, 312, 314, 416 and the net transport application 308 may be used in various combinations according to the needs of a particular situation.

The operating system 302 is preferably one of a conventional type such as, WINDOWS®, SOLARIS® or LINUX® based operating systems.

The memory unit 204 may also include one or more other application programs 304 including, without limitation, word processing applications, electronic mail applications, and spreadsheet applications.

The web browser 306 is one of a conventional type as has been described above.

The net transport application 308 is a procedure or routines that control the processor 202. The net transport application 308 may be used one either a workstation or a server. Although only a single net transport application 408 is shown in the memory 204 of FIG. 3 for ease of understanding the present invention, a server 102, 104, 106 will typically have several such net transport application 308; each application used for interacting with different groups of transport clients 812, rendering objects 808 or transport objects 804. A net transport application 308 preferably includes routines for invoking the net transport system. These routines operate as a scheduler 806 and defined a portion of the memory 204 as a work queue 810. The scheduler 806 and work queue 810 are used to manage one or more work items that in turn reference a first module 310 including transport clients 812, a second module 312 and a third module 314 including rendering objects 808, and a fourth module 316 including transport objects 804. Each of these components is described in more detail below with reference to the modules 310, 312, 314, 316 that process them. The scheduler 806 and work queue 810 are able to support heavy loads and many clients simultaneously and also include management of administrative reporting and client feedback on the status of submitted content. Such complex reporting demands of the transport clients 812 can be accomplished using rendering features of supplied by rendering objects 808.

The first module 310 includes one or more transport clients 812 and the routines for executing the transport clients 812. In particular, each of the transport clients 812 is an application program that uses the net transport application 308. The transport client 812 is responsible for gathering the information necessary to fill the request and generate a work item. More specifically, the transport client 812 provides a graphical user interface, including questions in response to which the user must use the computing device to enter the information into the system 100. For example, the transport clients 812 may gather the customer name, items to be sold or quoted, special terms requested etc. The information is application specific but independent of how the information is to be sent or where it is to be obtained. In one embodiment, the transport clients 812 presents a graphical display having blank fields in which the user can enter: 1) a rendering object 800, 2) the date and time, 3) an identifier as to who the request is from, 4) an identifier as to who the request is to, 5) a method for sending the response to the request, 6) data or cargo for the request, 7) a subject of the request, 8) a responder that is to handle the request, and a 9) priority for the request. In an alternate embodiment, the transport client 812 may also gather data including a server on which to execute the request it is not performed locally. The transport clients 812 also include routines for asking for an update on the status of to a previously submitted request and may be formatted as a cookie sent over the Internet. The transport clients 812 also include routines to determine if the system is accepting requests submissions. Once the user inputs the requested information, the transport clients 812 executed to transform the data into a work item and added it to the work queue 810 for further processing under the control of the scheduler 806.

In the context of a system 100 that generates insurance quotes, exemplary transport clients 812 preferably include a transport client that acquire data for an insurance application including the name and address of the applicant, the name of agent selling the policy, the desired coverage (liability, fire, theft, workers compensation, etc.), details for evaluating risk, and desired coverage dates. The operation of the first module 310 will also be described in more detail below with reference to FIG. 4.

The second module 312 includes one or more rendering objects 808 and the routines for executing the rendering objects 808. The second module 312 preferably uses information obtained by the module 310 to access database(s), both local and remote, to obtain information for further processing the information request. For example, public and private records may be accessed to find out about past losses for historical losses within the industry or geographic area where the coverage is to occur. Rendering objects 808 allows a submitted request to perform a complex information gathering process without making the transport client 812 wait for it to complete. In particular, the rendering objects 808 in the second module 312 are processes responsible for extracting data from a database using the information provided by a transport client 812. Each of the rendering objects 808 is an application program that uses the net transport application

308. The rendering object 808 is a program that makes database inquiries and returns information. For example, a particular rendering object has information about the database such as the schema used for organization, the language used such as SQL, and other information necessary to perform a successful query of the database. The rendering object 808 may be very simple to very complex. In one embodiment, the rendering object 808 is implemented using a Component Object Model (COM) and created as COM objects. As noted above, specific rendering objects 808 provide administrative reporting and reporting back to transport clients 812 as well. The rendering object 808 objects include routines to generate an instance of a particular rendering object 808 in response to a signal from the scheduler 806. Once in the work queue 810, the scheduler starts execution by calling a rendering object 808 and providing reference to a work item in the work queue 810. The rendering object 808 extracts data, in particular the cargo, necessary for the rendering object 808. For example, a rendering object 808 first retrieves information to identify the instance of the rendering object including the work item to which the rendering object 808 corresponds. A data structure referred to as a "sInformation" parameter is filled with data and holds this information for identification of the rendering object 808 for future use. Next, the rendering object 808 renders data to file by performing: 1) a no operation—simply passing the data or cargo through a rendering object 808 and not materially changing the data or performing processes with it, 2) a query operation—using the data or cargo from the request as the basis for a database query, performing the query on a specified database and returning the result. In addition, in certain embodiments an output parameter for the result of the rendering object 808 may be provided to a printer or other output device. This is a form of manual over-ride that can be input by the transport client 812, and thereby bypassed the need for a transport object 804 to process the output of the rendering object 808, rather the rendering object just directly output the result to a specified printer. The operation of the second module 312 will also be described in more detail below with reference to FIG. 5.

The third module 314 includes one or more rendering objects 808 and the routines for executing the rendering objects 808. In particular, the rendering objects 808 in the third module 314 are processes responsible for applying or enforcing business rules on the data extracted from the database by the second module 312. Each of the rendering objects 808 is an application program that uses the net transport application 308. The rendering object 808 is a program that checks business rules particular to that rendering object 808 to the data returned by the second module 312. For example, when the system 100 is configured provide insurance quotes, typical rules that would be enforced or performed by rendering objects 800 include determining if the risk and/or applicant are located in an area in which the insurance carrier is legally entitled to write coverage, determining if the address given is appropriate for the location or the risk, determining if the risk is within the agents territory, determining if the risk is of a type that the carrier is willing to carry. Furthermore, those skilled in the art will recognize that these rendering objects 808 may be combined with the rendering objects 808 doing the extracting into a single object with performs queries on a database and then applies the business rule to produce a result that is stored in a file and identified in the corresponding work item. The operation of the third module 314 will also be described in more detail below with reference to FIG. 6.

The fourth module 316 preferably comprises routines that format the data as appropriate for the media on which it is to be presented. For example, if the data is to be presented as a fax, margins must be set for pages, justification and pagination must be applied as well as other formatting conversions. The fourth module 316 includes one or more transport objects 804 and the routines for executing the transport objects 804. In particular, the transport objects 804 in the fourth module 316 are processes responsible for producing the display format and delivery of information returned by a rendering object 808 of the third module 314. Each of the transport objects 804 is an application program that uses the net transport application 308. The transport object 804 a program that receives the data from the scheduler 806, formats the data in a presentation format specified by the routines of the transport object, and the delivers the data in a manner dictated in the transport object 804. For example, net transport may use either local resources to deliver the document produced by the rending object, or may use a network connection to use other delivery mechanisms provide by other servers. The transport objects 804 can use resources that are not on the local computer system but residing on a remote system by using the routing table 802. At the appropriate time based on the availability of resources or at a specified predetermined time, the transport objects 804 sends the document to the destination specified, using the manner specified. Preferably, there is one transport object 804 for each type of delivery such as one for fax, a second for e-mail, a third for pager, etc. Similarly each of the transport objects 804 can be to a predetermined recipient or group of recipients. The use of such objects advantageously separates the transport or delivery from the processing of the data. This is advantageous because each transport object 804 includes a driver adapted for a particular type of delivery technology. This allows objects to be re-used and also allows new objects to be easily written for new methods of content delivery. For example, new or multiple drivers can be written to be to take advantage of technology that was not in existence when the other objects 812, 808 were created. Thus, if a different fax server is added to the system, a driver is all that needs to be written, and the system 100 will be fully operational. The operation of the fourth module 316 will also be described in more detail below with reference to FIG. 7.

C. Modules and their Interaction

Figure 5:
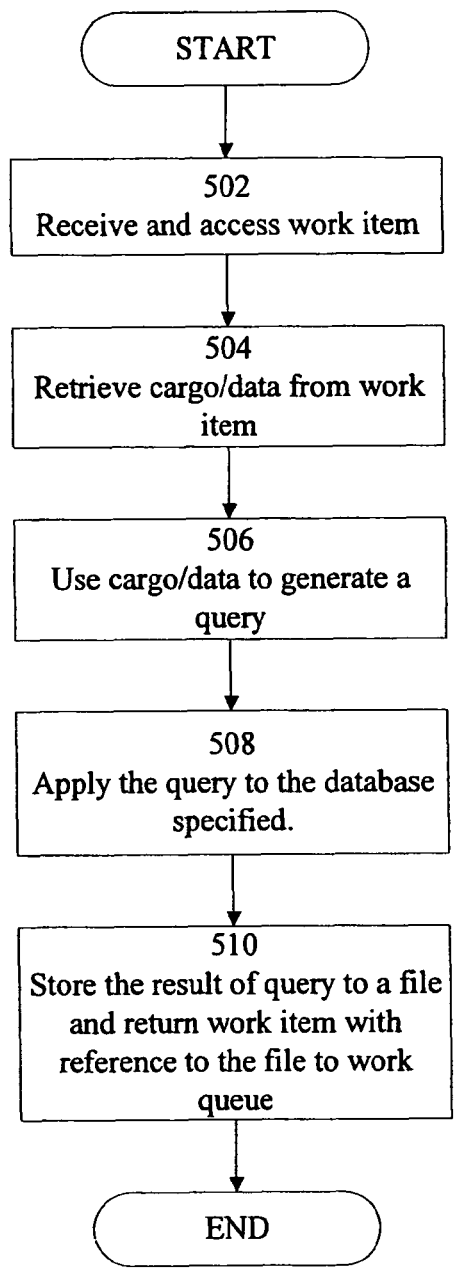
FIG. 5 is a flow chart of a preferred method for extracting information using the second module.
Figure 8:
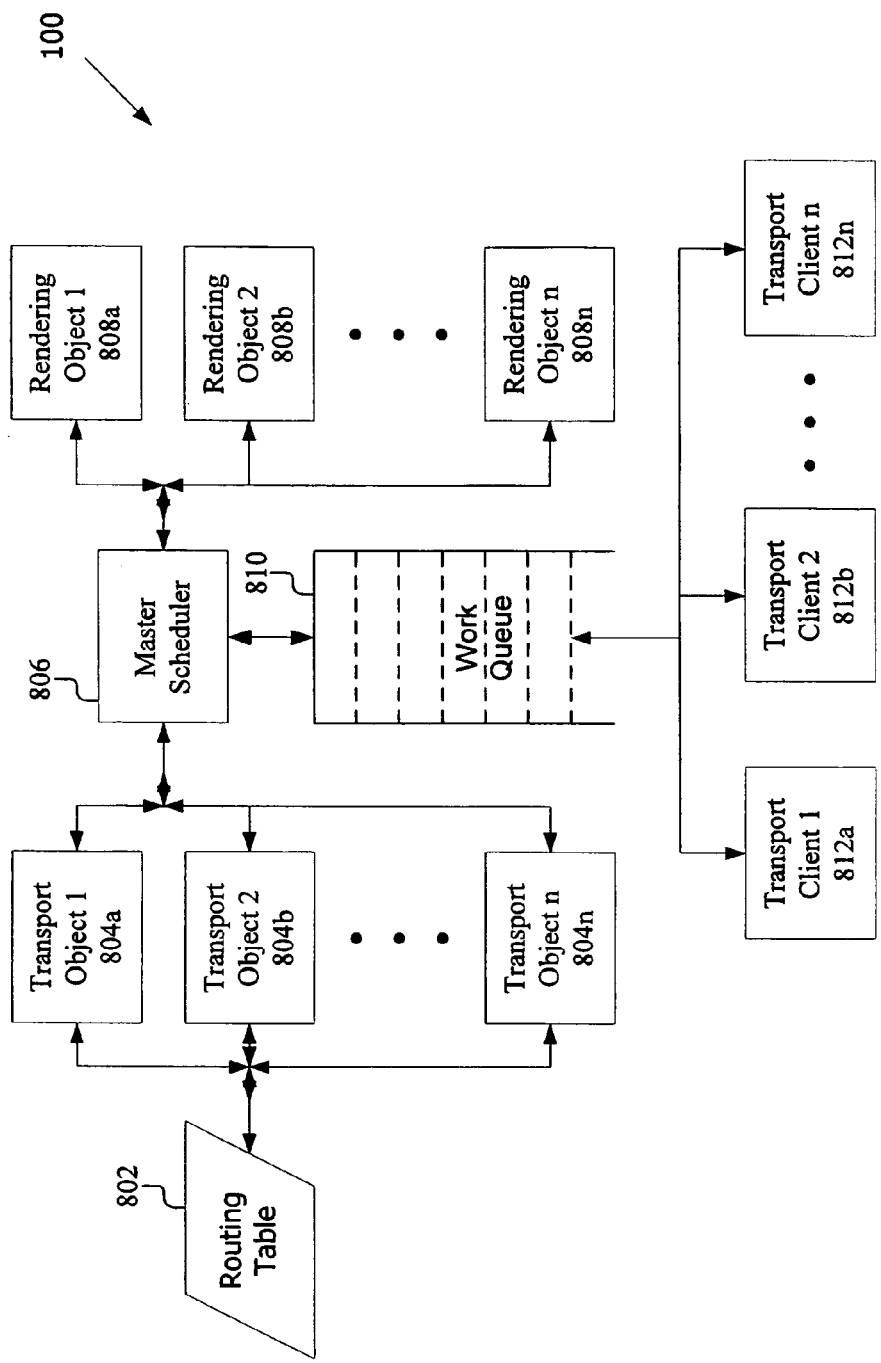
FIG. 8 is a functional block diagram of a system according to the present invention showing the interaction between the modules.

Referring now to FIG. 8, the interaction of objects 804, 808, 812 and the modules 310, 312, 314, 316 are described in more detail. FIG. 5 is a schematic diagram illustrating the relationship between the master scheduler 806, the work queue 810, a routing table 802, and a plurality of transport clients 812*a-n*, rendering objects 808*a-n*, and transport objects 804*a-n* in accordance with the present invention. The present invention is directed to the submission of a request and creation of a response documents and delivery of that response document.

The plurality of transport clients 812*a-n* are used to interact with various users. The transport clients 812*a-n* gather the information necessary to fill the request. Each request has some predetermined information that must be input by a user at a client-computing device. The transport clients 812*a-n* display user interfaces, run scripts and other routines to ensure the information required by a request is input. As noted above, such information may include the customer name, items to be sold or quoted, special terms requested etc. Once the information has been input, the transport clients 812*a-n* create a data structure referred to as a work item and send the work item to the master scheduler 806 for addition to the work queue 810. In one exemplary embodiment, work items include: 1) The data to be used in fulfilling the request either as immediate data item or a reference to a file containing the data; 2) a destination for the data e.g. an address, a fax number or an email address; 3) a rendering object; 4) a transport object or mechanism that specifies how that data is to be delivered; 5) a server or computer offering the service on which the rendering request is to be executed—scheduler will confirm the request to be executed on a server having a sufficient level of privilege to honor the request, to run the necessary programs and/or access the necessary data; and 6) a priority in servicing the work item.

The work queue 810 is a portion of memory for storing the work items. The work queue 810 is another data structure within the net transport system that stores all the above items for the work item and the status of the work item. Status includes whether the work items are complete or is waiting for resources and whether or not there have been errors in processing.

The master scheduler 806 is the major portion of the net transport application and examines items in the work queue 810 and arranges for them to be serviced in the proper order. Each of the items in the work queue 810 has one or more status flags to indicated whether the item has been: added to the work queue 810 by a transport client 812*a-n*; sent to a rendering object 808*a-n* for processing, returned as processed by the rendering object 808*a-n*, sent to a transport object 804*a-n* for processing, or returned by the transport object 804*a-n* as having been delivered.

In practice processing proceeds as follows: a transport client 812*a-n* formats and submits a request as a work item and adds it to the work queue 810. The master scheduler 806 examines the work items and decides which if any rendering object 808*a-n* is available to process the work item. It is possible that a null rendering object 808*a-n* is supplied that indicates that the data is ready for transmission as supplied. The status of the work item in the work queue 810 is changed to reflect that it is currently being processed by the rendering object 808*a-n*. The rendering object 808*a-n* makes database inquiries and contains and enforces business rules. Once all database inquiries have been done and business rules checked by the rendering object 808*a-n*, the rendering object 808*a-n* returns information correct and suitable for further processing and associates it with item in the work queue 810.

When the rendering object 808*a-n* is finished extracting data and applying business rules as defined by that particular rendering object 808*a-n*, the appropriate data is now associated with the work item in the work queue 810. Its status is updated to mark it as ready for transmission. At the appropriate time, based on the availability of resources and the priority of the item in the work queue 810, the items are submitted to the transport object 804*a-n*. The transport object 804*a-n* forwards the formatted data to the proper mechanisms for transmission. The transport object 804*a-n* can use resources, which are not on the local computer system but residing on a remote system. The transport object 804*a-n* consults its routing table 802 so that it knows whether there are local resources to handle the work item or whether work item is handled by another computing device or server on the network. Additionally the routing table 802 may be modified, under program control, to allow traffic destined for one location to be delivered to another location. For example, email traffic may be sent to an alternate e-mailbox, or by fax or by pager. In the preferred embodiment, there is a transport object 804*a-n* for each type of delivery mechanism. For example, a first transport object 804*a* is for transmission by facsimile, a second transport object 804*b* is for transmission by e-mail, a third transport object 804*c* is for transmission by pager, and a fourth transport object 804*d* is for transmission by printing. Those skilled in the art will recognize that the present invention provide flexibility in this manner since new transmission technologies can be accommodated simply by adding a transport object 804 for the new transmission mechanism. For example, if the method for delivery of the "document" were by converting it to speech and then outputting it over a telephone, a new transport object 804 could be written to accommodate such a new transmission technology without having to re-write the entire document creation, processing and delivery system.

One example of application of the present invention is in the generation of quotations for insurance rates and terms. A quotation typically includes a cover letter is generated with addresses and names taken from a database. To price the policy rating factors retrieved from a database and incorporated for verification. In as much as the final price to the customer includes a commission for the sales agent, the agent is allowed to supply his commission (within some latitude) for incorporation with the final quote. In a simple case, these documents are printed for mailing. In cases that are more complex the document may be faxed. The faxing processes involves generating the content of the document on one machine; rendering the FAX image (changing it from a text-based document to a bit mapped image) on a second machine; transmission of the image on a third machine and finally the archiving of the image of the document (for legal reasons) on a fourth machine. This process is automated by the present invention in that a transport client 804 is provided for delivery of a printed document, and a second transport client 804 is provided to send the document by fax. Rendering objects 800 are provided to archive a copy of the fax document, generate the cover letter, price the insurance quote and adjust the commission. Finally, a transport client 812 that collects information from the sales agent, and specifies a method of delivery and the rendering objects 808 that are to operate on the data provide. An example of documents created by the system 100 is provided in Appendix A.

Another example of application of the present invention is to providing price quotes for a custom machine shop might work. The shop receives drawings from customers that describe items to be built. The prior art approach would be as follows. The shop will use the "Bill of Materials" (which is part of the drawing set for each part to be built) to discover what materials are required for the part. The material must be priced and the prices aggregated to from a major part of the quote. The parts do not from the entire quote but are a significant part the quotation. This is frequently done manually, literally by looking items up on a parts book, entering the values on a ledger sheet and manually adding the values. Besides looking up the prices for materials, discounts must be applied as materials generally cost more in volume. With the present invention this process would be streamlined to the following. A transport client 812 running on a local workstation 112 would acquire the information comprising the bill of materials through a user entering it into the system. Once the data is entered, it is submitted to the work queue 810 for processing. The master scheduler 806 discovers the work item in the queue 810. There may be more than one item in the work queue 810 as there may be more than one workstation 114 acting as a transport client 812*a-n*. The master scheduler 806 directs the request to a rendering object 808*a* and by use of one of the transport objects 804*a*, which identify to the scheduler 806 how the data is to be transported. The rendering object 808*a* preferably includes routines to examine the request, retrieve costs from a database, place these values into the electronic document being generated, apply business rules regarding markups to the costs discovered in the database, and apply business rules regarding discounts. If the values need are not found in the database the rendering object 808*a* can either forward the request to another rendering object 808*b* for processing (e.g. another rendering object on a purchasing agent's computer) to obtain the missing object or return the item unprocessed.

D. Methods

Referring now to FIGS. 9 and 4-7, the methods and processes of the present invention are described in more detail.

Figure 9:
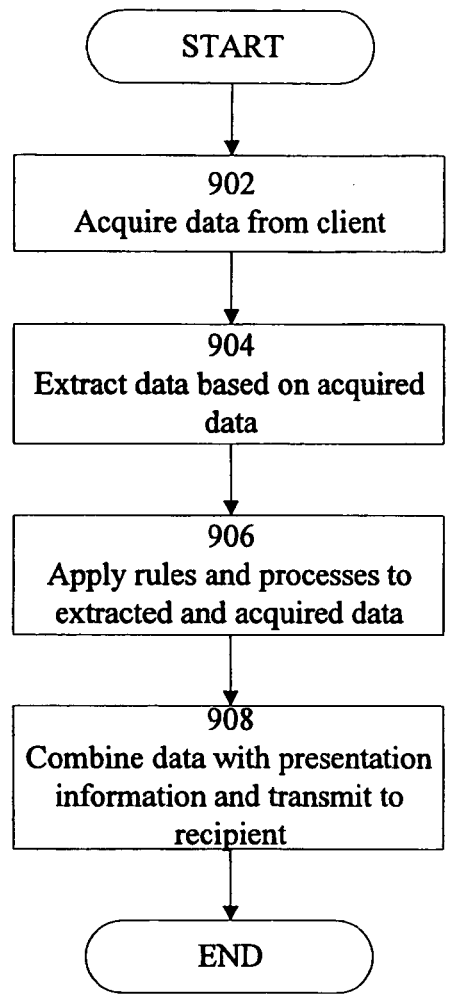
FIG. 9 is a flow chart of a preferred method generating responses to information requests in accordance with the present invention

The general method for processing requests will first be described with reference to FIG. 9, and also with reference to FIG. 8. The method begins in step 902 by acquiring data from the user. In particular, a transport client is used to present user interfaces and get the user to input the data necessary to process the request into the system. Next in step 904, the method extracts information from a database using the acquired data. This is preferably done by a rendering object that uses the acquired data to generate a query and applies the query to a database. Then in step 906, a number of business rules are applied to the data returned by the query in step 904. Again, a rendering object performs this application of business rules. Once the rendering object modifies the data according to the business rules, the resulting data is formatted for display and combined with other information from the original request and then transmitted to a recipient using a transport object.

Figure 4:
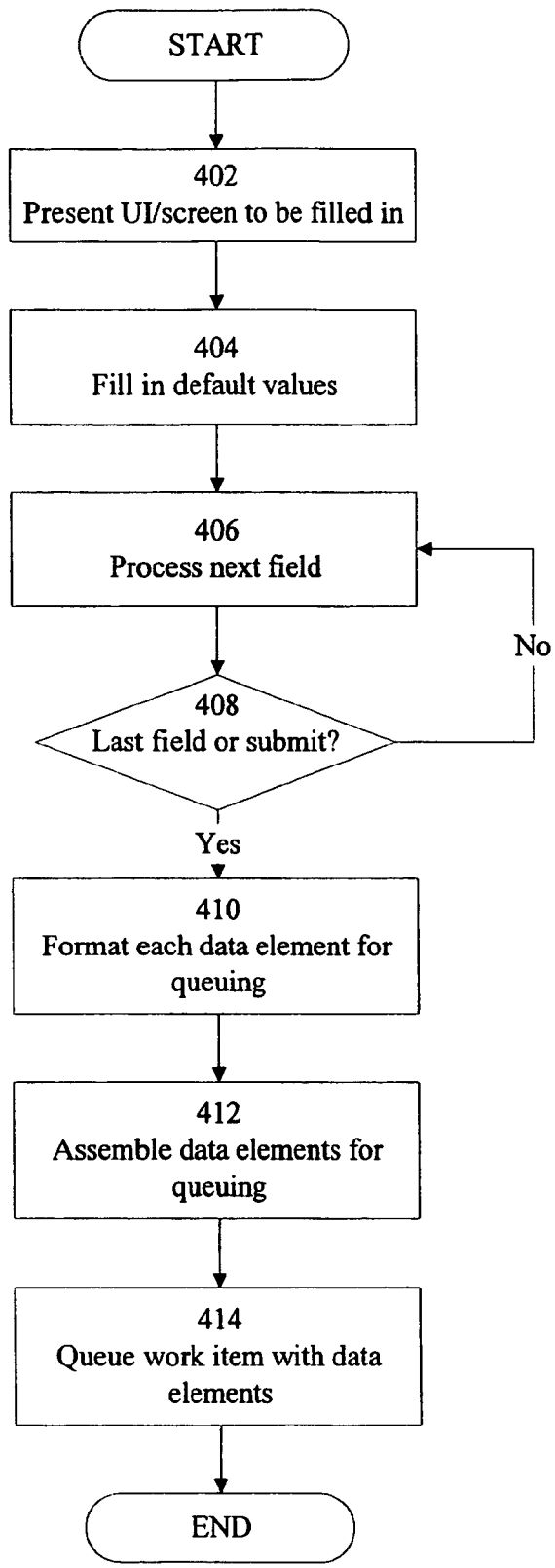
FIG. 4 is a flow chart of a preferred method for acquiring data from a client-computing device using the first module.

Referring now to FIG. 4, the preferred method for acquiring data from a client-computing device 112 using the first module 310 is shown. The process begins in step 402 by presenting a user interface (UI) or screen on the display device 200 of the computer 112. Next, the module 310 and the transport client 812 fill in 404 default values in to fields that from part of the user interface. Then in step 406, the user inputs data the input data and field are processed. There is minimal verification that is done by the transport client 812 to confirm that data is of the proper type or format. After step 406, the method tests whether the last filed has been processed in step 406, or whether the user has input the submit command. If not, the process returns to step 406 to process the next field. If so, the process continues in step 410 to format each data element for queuing. The data is preferably formatted such as tab delimited, fixed field with or some other agreed upon format that has been set in the transport client 812. Then, the data elements are assembled as a work item for queuing. Assembly of the data elements puts them in an order that is expected by the rendering objects 808 that will process the work item. Finally, the transport client 812 performs a routine to create the work item including the properly ordered data elements, and the work item is added to the work queue 810 and the method is complete.

Referring now to FIG. 5, the preferred method for extracting information using the second module 312 will be described. The method begins in step 502 with the rendering object 808 receiving and accessing a work item. Typically, the scheduler 806 passes a work item to a rendering object 808 for further processing. The rendering object 808 then retrieves 504 the cargo or data corresponding to the work item. This cargo may be stored as part of the work item or the work item may just have a reference to a file that contains the cargo. Next, the cargo is used to generate 506 a query according to the language used by the database. Then the generated query is applied 508 to a database specified in the work item. This may be done using any existing database management programs such as Microsoft SQL Server, Oracle and DB2 to manage the information, and the rendering object 808 may include standard (industry wide) or proprietary methods of accessing the data whether it is stored local or remote. The result of the query is then stored 510 to a file and a reference to the file is added to the work item. The work item is then returned to the work queue 810 for further processing.

Figure 6:
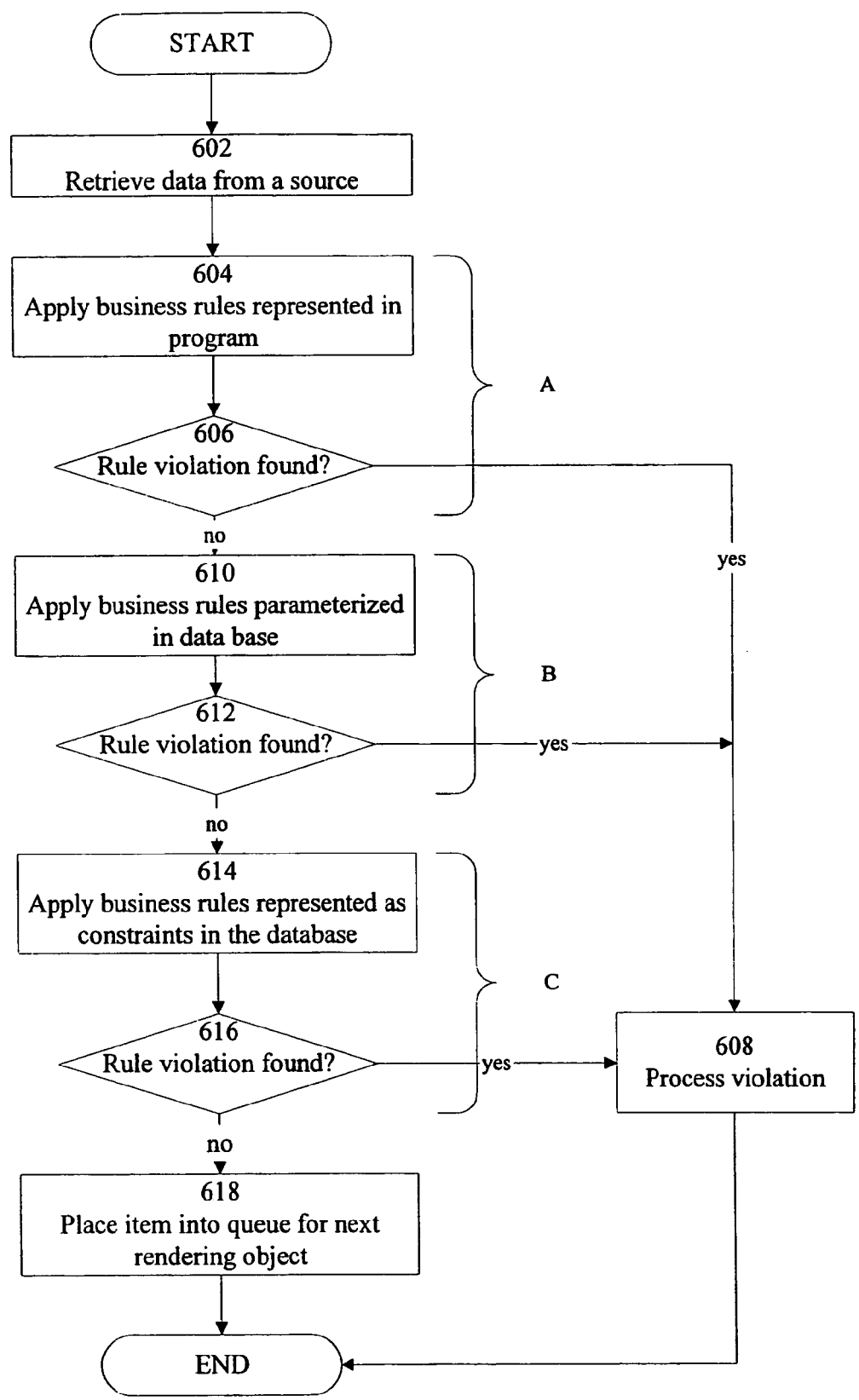
FIG. 6 is a flow chart of a preferred method for applying rules to information extracted using the third module.

Referring now to FIG. 6, the preferred method for applying rules to information extracted using the third module 314 will be described. The process begins in step 602 with a rendering object 808 retrieving data form a source. In this case, the source of the data for the operation may be the data returned by another rendering object 808, the result of a query, a register on the system, or data from retrieving a file. The process continues by first applying 604 business rules represented as part of the rendering object's routines to the data from step 602. Rules may be applied as program elements (testing a value to be within specified ranges). These ranges may be built into the program (rendering module) as values. Then in step 606, the method determines if there was a rule violation resulting from the application of the business rules to the data. If so the method proceeds to step 608. In step 608, the method processes the violation. Such processing preferably includes: 1) sending the work item to another rendering object 808 to fill in missing data 2) returning the work item o the transport client, or 3) signaling an error condition. If there was not a rule violation found in step 606, the method continues in step 610 to apply business rules parameterized in the database. This requires a query of the database and application of business rules. The values for the business rules may be parameter stored in the database that must be retrieved before being applied to the data from step 602. Such parameterized values are advantageous because they may be retrieved from a database thereby facilitating the modification of the values without modifying the rendering object 808. Again in step 612, the method determines if there was a rule violation resulting from step 610. If so the method proceeds to step 608 before ending. If not the method continues in step 614 to apply business rules represented as constraints in the database. The rules may be built as constraints in a relational database such as the ones aforementioned. Rules may specify an arbitrarily complex description such as calculated limits based on other values input from the extraction module, or variables in a database. The relationships may also used set theory to specify the constraints. For example, the zip code of the applicant must be a member of the set of zips codes where the agent is allowed to write business and must be a member of the set of zip codes where the company is allowed to write business. The zip code of the risk for a business policy may not be a zip code where the type of business to be insured is prohibited. The city and state of the address must be appropriate for the zip code. After step 614, the method again tests for a rule violation. If one is found the method continues in step 608. If one is not found, then the method returns the work item including the result of data retrieval of step 602 after application of the rules back in the work queue 810 for other object to process. Those skilled in the art will recognize that the method of FIG. 6 was described for convenience as a single method, however portions A, B or C could alone form a method with step 602, 608 and 618. Furthermore, it should be understood that portions A, B or C may occur in any order and may be performed or repeated any number of times.

Figure 7:
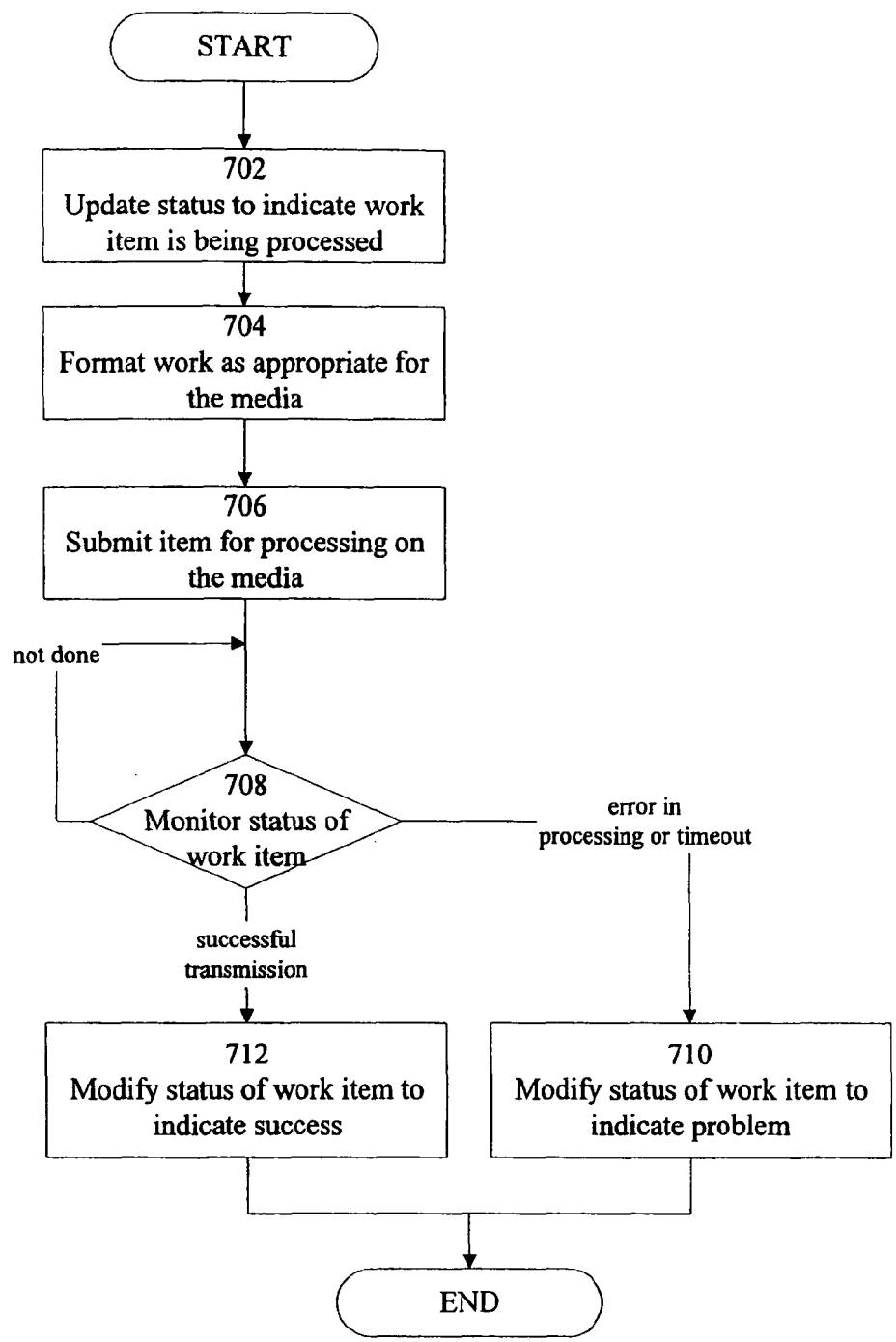
FIG. 7 is a flow chart of a preferred method for delivering content using the fourth module and transport objects.

Referring now to FIG. 7, a preferred method for delivering content using the fourth module 316 and transport objects 804 is shown. The method begins in step 702 with the transport object 804 updating the status of the work item to indicate it is being processed. Then the work item, or its cargo or result is formatted 704 as appropriate for the media over which it will be transmitted. Each different media will have a different format. Then the work item is submitted 706 for processing by over a media. There are preferably multiple threads serviced by each media, thus, reducing the possibility that resources will not be available. Then in step 708, the method monitors whether the work item was successfully transmitted. If the item is still processing, the method loops back to step 708. If there was an error in processing or a time out, then the method proceeds to step 710 and modifies the status of work item to indicate an error and the method ends. If transmission is successful, then the method modifies the status of work item to indicate a successful transmission and the method ends.

Figure 10:
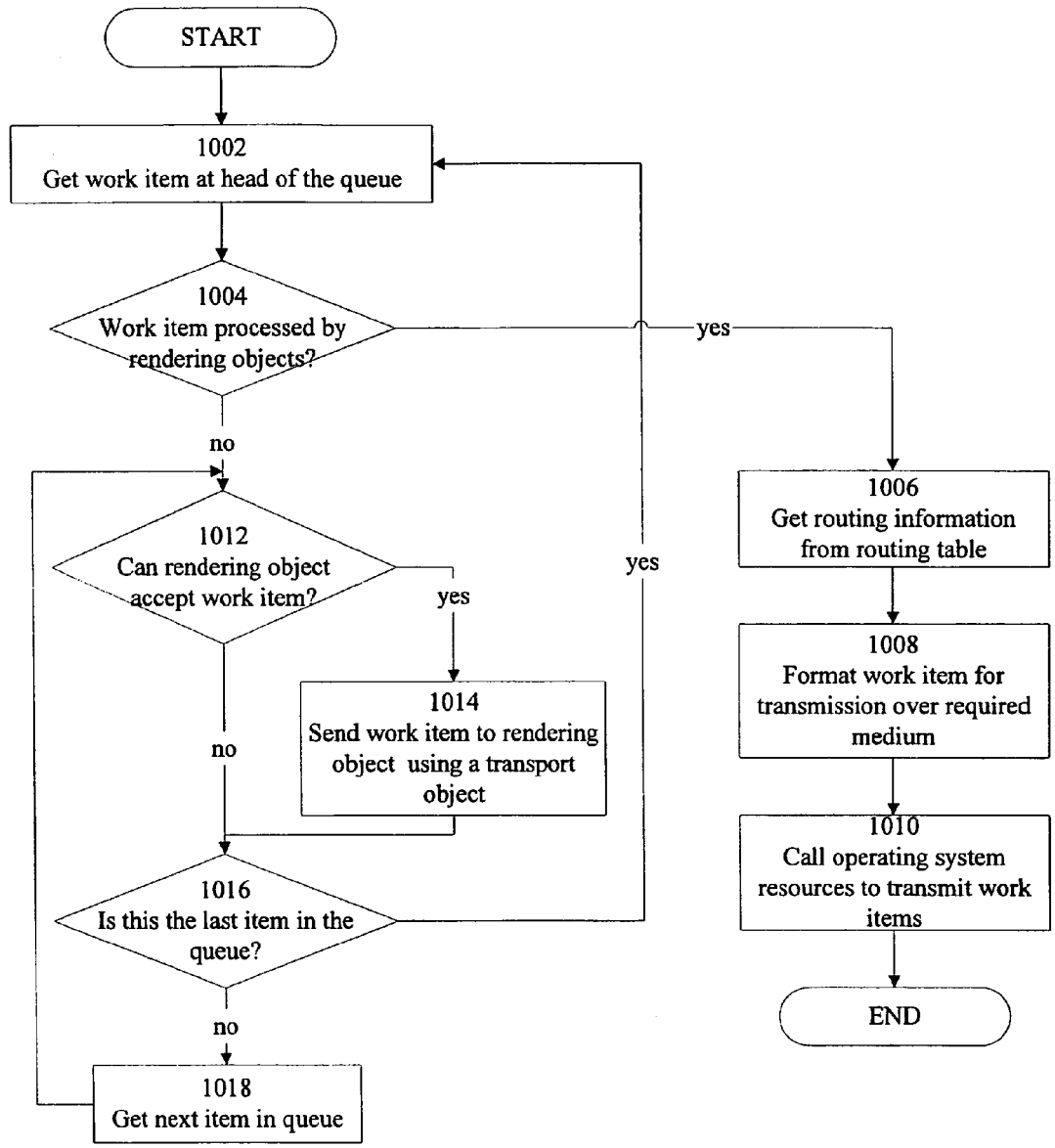
FIG. 10 is a flow chart of a preferred method for processing information requests according to the present invention for a system having a work queue and a master scheduler.

Referring now to FIG. 10 is a flow chart of a preferred method for processing information requests using a work queue 810 and a master scheduler 806 will be described. The process begins with the master scheduler 806 retrieving 1002 the work item at the head of the work queue 810. Then the method tests 1004 if the rendering object 808 has processed the work item. Is so, the results of the rendering object 808 can be delivered and the process continues in step 1006 where the routing information is retrieve from the routing table 802. In step 1008, the scheduler 806 formats the results of the work item for transmission over the identified medium and in step 1010, the scheduler 806 call operating system resources to transmit the work item.

If a work item is identified as unprocessed by the rendering object 808 in step 1004, the scheduler determines 1012 whether the rendering object 808 identified in the work item can accept another work item for processing. If so, the scheduler 806 sends 1014 the work item to the rending object 808 using a transport object 804. After either step 1012 or 1014, the scheduler 806 tests if this work item is the last on in the work queue 810. If not the scheduler 806 retrieves the next work item in the work queue 810 and continues processing in step 1012. If this work item is the last on in the work queue 810 the method returns to step 1002 to begin processing from the head of the queue 810.

E. User Interface

Referring now to FIGS. 11-15, some of the user interfaces provided for operating the system 100 of the present invention are shown.

Figure 11:
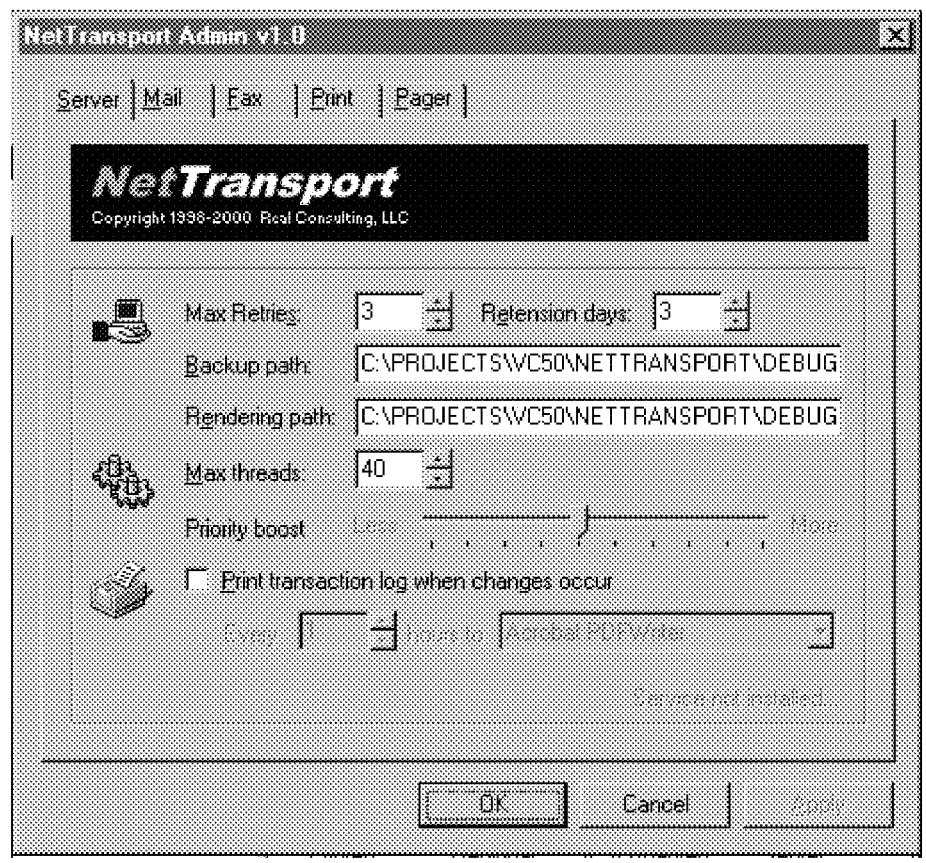
FIGS. 11-15 are graphical representations of a display device showing a user interfaces for modifying the operational aspect of the system of the present invention.

FIG. 11 illustrates a user interfaces of a server tab that allows a system administrator to configure basic settings the system 100 will use when delivering client content. The system 100 outputs a transportation log describing all submittals and their delivery status at predetermined intervals. At the lower right of this screen displays the current status of the system 100. Any changes made here will stop system 100 and apply the changes then restart the system 100 whenever the "Apply" button is pressed. The "Max Threads" setting option, will allow from 1 to 255 threads to run concurrently.

Figure 12:
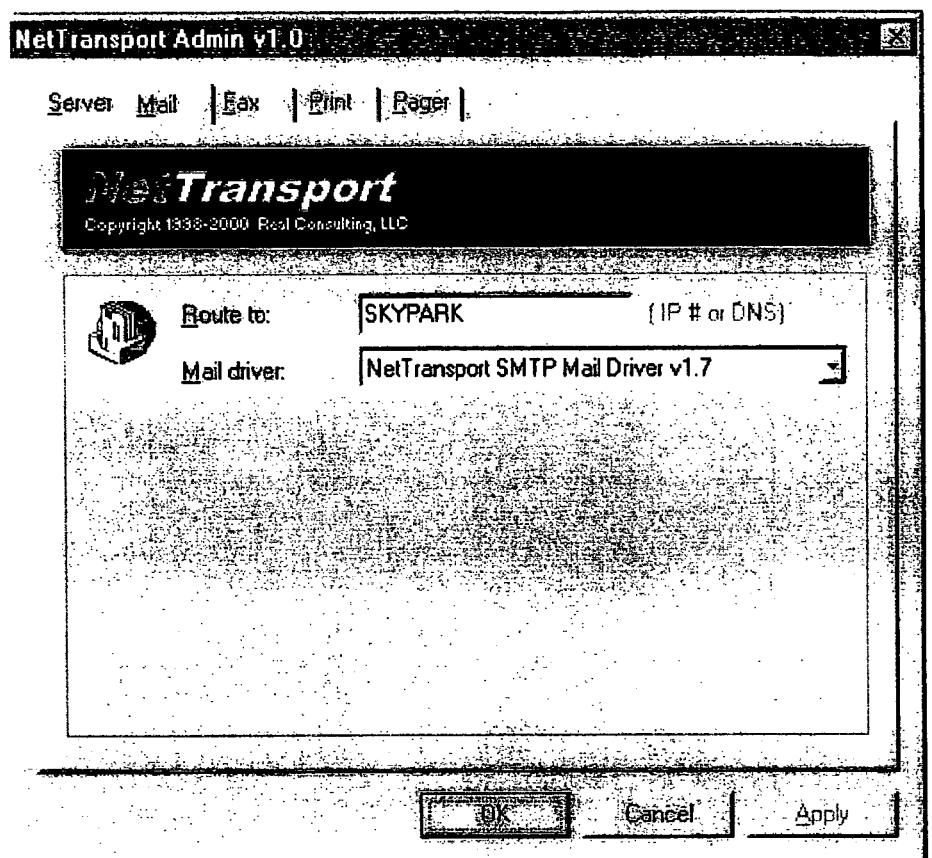

FIG. 12 illustrates a user interfaces that allows the system administrator to set an e-mail driver (default transport object 804) use to deliver mail, and a default routing (the name of an IIS sever).

Figure 13:
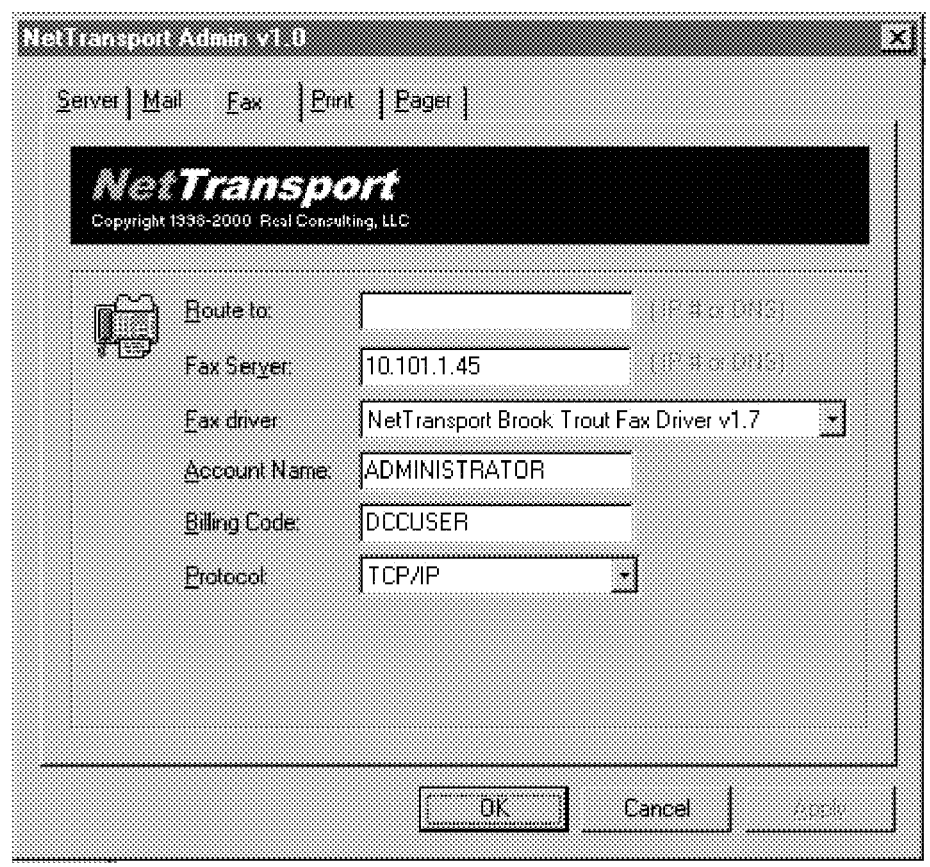

FIG. 13 illustrates a user interfaces that allows the system administrator to enter the proper account, billing codes and transport layers to be used for delivering fax content. This is another method for setting a default transport object 804.

Figure 14:
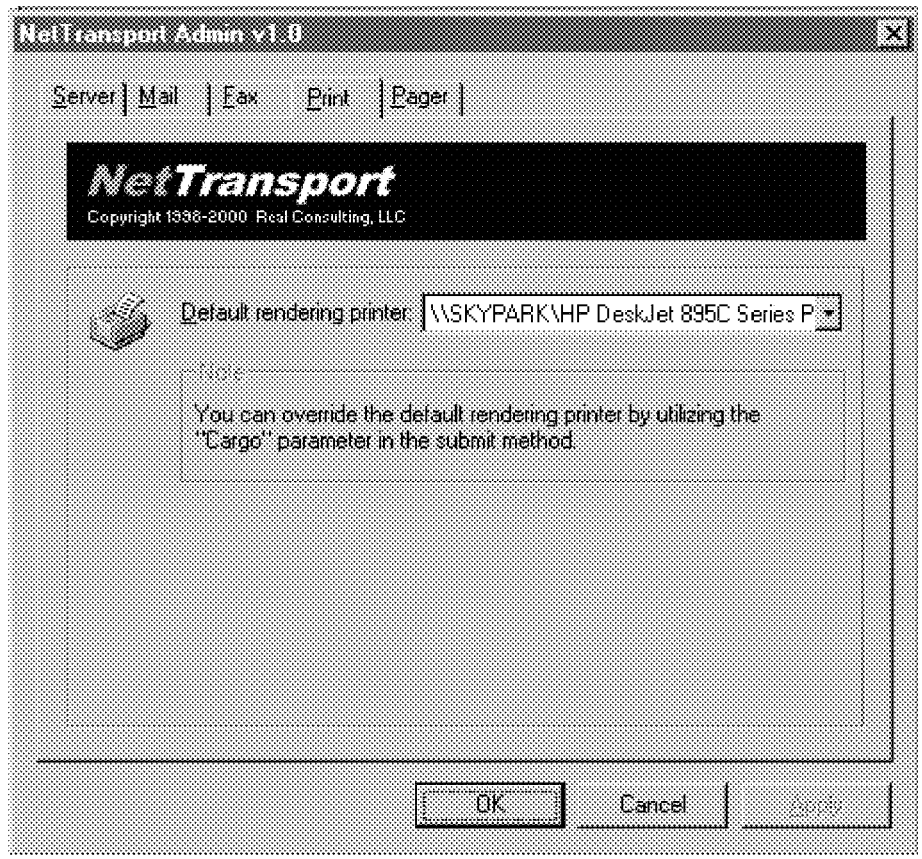

FIG. 14 illustrates a user interfaces that allows the system administrator to select the default printer that print submissions will default to when delivering print content.

Figure 15:
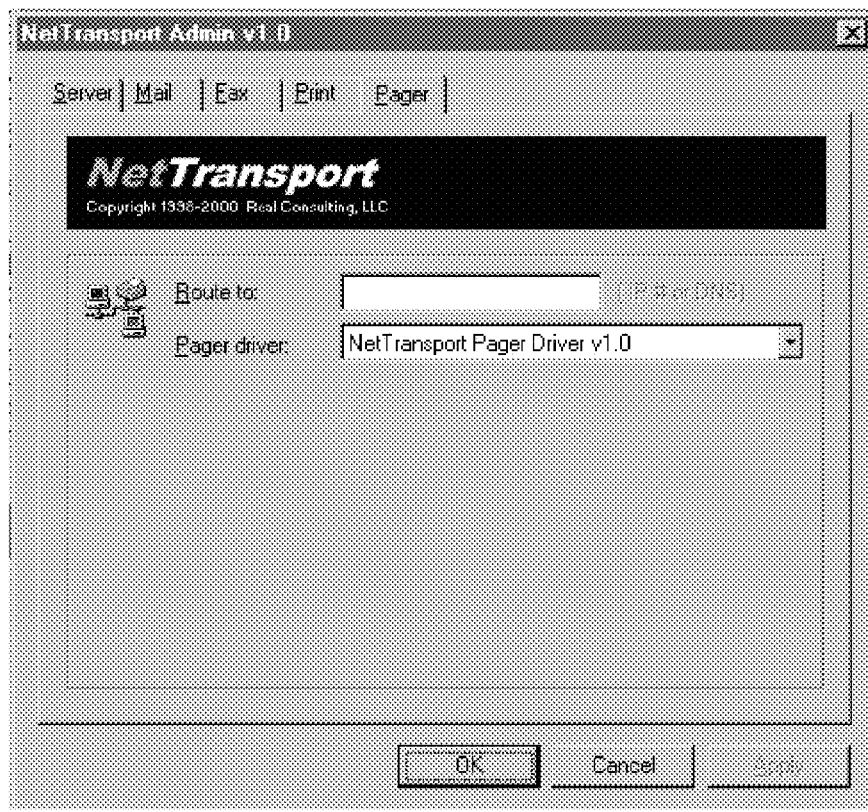

FIG. 15 illustrates a user interfaces that allows the system administrator to select the default driver to use when delivering pager content.

While the present invention has been described with reference to certain preferred embodiments, those skilled in the art will recognize that various modifications may be provided. Variations upon and modifications to the preferred embodiments are provided for by the present invention, which is limited only by the following claims.

Appendix A

Exemplary documents created by the system 100.

This Quote does NOT provide Insurance

Applicant Copy  Printed 02/16/2001

| Quote ID | 239500 BGK | Eff Date | 12/18/2000 | NAD | 12/30/2000 | Exp Date | 5/1/2001 |
|---|---|---|---|---|---|---|---|

Estimate of Annual Premium prepared for

Broker
Name: JOHNSON & HIGGINS OF WASHINGTON
Address: 1401 EYE ST N W STE 400
City, State Zip: WASHINGTON, DC 20005
Phone: (202) 408-6154
Fax: (530) 470-7333
Attn: Mr Soble II

Applicant
Name: THE RAGE
Address: FINDING HEAVEN
City, State Zip: GRASS VALLEY, CA 95945
Phone: (530) 465-4321
Fax:

| | Class Code | Description | | Base Rate | Estimated Payroll | Base Premium |
|---|---|---|---|---|---|---|
| G | 0016C | Deciduous Fruits Growing | 2000 | 18.39 | 509,552 | 93,707 |
| | | | 2001 | 17.08 | 5,180,448 | 884,821 |
| | 00161 | Orchards-Citrus and Deciduous Fruits | 2000 | 18.39 | 88,433 | 16,263 |
| | | | 2001 | 17.08 | 899,087 | 153,581 |
| | 0016A | Orchards | 2000 | 18.39 | 86,597 | 15,925 |
| | | | 2001 | 17.08 | 880,403 | 150,373 |
| | 0016B | Citrus Fruit Growing-Grapefruit/Lime/Lemon/Or | 2000 | 18.39 | 59,903 | 11,016 |
| | | | 2001 | 17.08 | 609,017 | 104,020 |

| | | Period 1 | Period 2 | Total |
|---|---|---|---|---|
| Group Policy 5 California Farm Bureau Federation | Base Premium | 136,911 | 1,292,774 | 1,429,685 |
| Group NAD 1/1/2001 | Experience Mod | 0.79 | 0.79 | |
| Kaiser | Standard Premium | 108,160 | 1,021,291 | 1,129,451 |
| Employer's Liability Limits: | | 0.82 | 0.83 | |
| $1,000,000 | | 1.0000 | 1.0000 | |
| | | 1.00 | 1.00 | |
| | | | 0.7900 | |
| | | 0.90 | 0.90 | |
| | Rating Plan Modifier | 0.82800 | 0.83700 | |
| | Estimated Modified Premium | 89,556 | 854,821 | 944,377 |
| | Estimated Premium Discount Credit Factor | 0.76415 | 0.76416 | |
| | Estimated Annual Premium | 68,435 | 653,218 | 721,653 |
| | Interim Billing Factor | 0.63272 | 0.63960 | 0.50476 |
| | Minimum Premium | | | 100 |

This Quote does NOT provide Insurance

| | Applicant Copy | Printed 02/16/2001 |
|---|---|---|

Quote ID  239500  BGK    Eff Date 12/18/2000   NAD 12/30/2000    Exp Date 5/1/2001

This quote is based on information provided to State Fund.

Premium Discount
Modified Premium is discounted according to the following schedule.

| | | |
|---|---|---|
| First | $1,000 | 0% |
| Next | $4,000 | 21.6% |
| Above | $5,000 | 27.2% |

*Interim billing rates shown in this quote will be used on payroll reports. They take into account rating plan credits (or debits) which will apply at final billing and an estimate of your premium discount as detailed above. The actual discount applied at final billing will be based on the actual payroll reported on your policy and subject to audit.

Class Code & Rate Summary

| Class Code | Base Rate | Interim Billing Rate |
|---|---|---|
| 0016C | 18.39 / 17.08 | 11.64 / 10.92 |
| 00161 | 18.39 / 17.08 | 11.64 / 10.92 |
| 0016A | 18.39 / 17.08 | 11.64 / 10.92 |
| 0016B | 18.39 / 17.08 | 11.64 / 10.92 |

Your experience modification will apply to these interim billing rates.

| | | | |
|---|---|---|---|
| WCA Surcharge (mandatory) 0.1389% of premium | 95 | 907 | 1,002 |
| WCFA Surcharge (mandatory) 0.23% of premium | 157 | 1,502 | 1,659 |
| CIGA Surcharge (mandatory) 1% of premium | 684 | 6,532 | 7,216 |
| Initial premium deposit | | | 72,165 |
| Total Deposit | | | 82,042 |

This Quote does NOT provide insurance

Broker Copy  Printed 02/16/2001

| Quote ID | 239500 BGK | Eff Date | 12/18/2000 | NAD | 12/30/2000 | Exp Date | 5/1/2001 |

Estimate of Annual Premium prepared for

Broker
Name: JOHNSON & HIGGINS OF WASHINGTON
Address: 1401 EYE ST N W  STE 400
City, State Zip: WASHINGTON, DC 20005
Phone: (202) 408-6154
Fax: (530) 470-7333
Attn: Mr Soble II

Applicant
Name: THE RAGE
Address: FINDING HEAVEN
City, State Zip: GRASS VALLEY, CA 95945
Phone: (530) 465-4321
Fax:

| | Class Code | Description | | Base Rate | Estimated Payroll | Base Premium |
|---|---|---|---|---|---|---|
| G | 0016C | Deciduous Fruits Growing | 2000 | 18.39 | 509,552 | 93,707 |
| | | | 2001 | 17.08 | 5,180,448 | 884,821 |
| | 00161 | Orchards-Citrus and Deciduous Fruits | 2000 | 18.39 | 88,433 | 16,263 |
| | | | 2001 | 17.08 | 899,067 | 153,561 |
| | 0016A | Orchards | 2000 | 18.39 | 86,597 | 15,926 |
| | | | 2001 | 17.08 | 880,403 | 150,373 |
| | 0016B | Citrus Fruit Growing-Grapefruit/Lime/Lemon/Or | 2000 | 18.39 | 59,903 | 11,016 |
| | | | 2001 | 17.08 | 609,017 | 104,020 |

Group Policy
5 California Farm Bureau Federation
Group NAD 1/1/2001
Kaiser
Employer's Liability Limits:
$1,000,000

| | Period 1 | Period 2 | Total |
|---|---|---|---|
| Base Premium | 136,911 | 1,292,774 | 1,429,685 |
| Experience Mod | 0.79 | 0.79 | |
| Standard Premium | 108,160 | 1,021,291 | 1,129,451 |
| Group Insurance Rating Modifier | 0.92 | 0.93 | |
| | 1.0000 | 1.0000 | |
| Merit Rating Plan Modifier | 1.00 | 1.00 | |
| | | 0.7900 | |
| Kaiser Alliance Modifier | 0.90 | 0.90 | |
| Commission Adjustment Modifier | | | |
| Rating Plan Modifier | 0.82800 | 0.83700 | |
| Estimated Modified Premium | 89,556 | 854,821 | 944,377 |
| Estimated Premium Discount Credit Factor | 0.76415 | 0.76416 | |
| Broker Commission | | | See Below** |
| Estimated Annual Premium | 68,435 | 653,218 | 721,653 |
| Interim Billing Factor | 0.63272 | 0.63960 | 0.50476 |
| Minimum Premium | | | 100 |

This Quote does NOT provide Insurance

Broker Copy  Printed 02/16/2001

Quote ID  Z39500 BGK  Eff Date 12/18/2000  NAD 12/30/2000  Exp Date 5/1/2001

This quote is based on information provided to

Premium Discount
Modified Premium is discounted according to the following schedule.

| | | |
|---|---|---|
| First | $ 1,000 | 0% |
| Next | $ 4,000 | 21.8% |
| Above | $ 5,000 | 27.2% |

\* Interim billing rates shown in this quote will be used on payroll reports. They take into account rating plan credits (or debits) which will apply at final billing and an estimate of your premium discount as detailed above. The actual discount applied at final billing will be based on the actual payroll reported on your policy and subject to audit.

Class Code & Rate Summary

| Class Code | Base Rate | Interim Billing Rate |
|---|---|---|
| 0016C | 18.39 / 17.08 | 11.64 / 10.92 |
| 00161 | 18.39 / 17.08 | 11.64 / 10.92 |
| 0016A | 18.39 / 17.08 | 11.64 / 10.92 |
| 0016B | 18.39 / 17.08 | 11.64 / 10.92 |

Commission Status: Commission on this account will be paid at 0.00%.

Your experience modification will apply to these interim billing rates.

WCA Surcharge (mandatory) 0.1389% of premium  85  907  1,002
WCFA Surcharge (mandatory) 0.23% of premium  157  1,502  1,659
CIGA Surcharge (mandatory) 1% of premium  684  6,532  7,216
Initial premium deposit  72,165

Total Deposit  82,042

TERMS OF INSURANCE

February 16, 2001

MR SOBIE IT
JOHNSON & HIGGINS OF WASHINGTON DC
1401 EYE ST N W STE 400
WASHINGTON DC 20005

Dear Mr. It:

Thank you for applying for insurance with the .

This letter and the attached quote dated Friday, February 16, 2001 provide the terms under which an offer a workers' compensation policy for The Rage.

The payroll reporting and premium billing frequency for this policy will be monthly.

The minimum premium is $100 and is not subject to proration or refund.

Special coverage terms are as follows:

| | |
|---|---|
| ENDORSEMENT NO. 0060 - | Additional Insured Employer - County Education and Training Program |
| ENDORSEMENT NO. 0401 - | Relatives who are employed and reside in household of named employer are not covered. |
| ENDORSEMENT NO. 0750 - | Full Salary Benefits Not Insured |
| ENDORSEMENT NO. 1001 - | Operations: Restricts coverage to operations specifically described in policy. |
| ENDORSEMENT NO. 2429 - | Terms of Participation in an Integrated Health Care Program (Kaiser) |
| ENDORSEMENT NO. 2512 - | Experience Modification Endorsement 0.79 |

This quote for a group policy is dependent on your remaining a member in good standing in California Farm Bureau Federation, 5 for the entire policy period. If not, the quoted group discount will be rescinded, and State Fund will cancel this policy and replace it with a non-group policy with the same inception date.

Short term policy to Group

Your quote is based on group insurance with California Farm Bureau Federation.
The Anniversary Rating date for this group is January 1, and your policy will be written to renew on this date.

*PLEASE PAY THIS AMOUNT* [deposit premium and mandatory assessment(s)] $82,042.

This quote expires on December 17, 2000. If we do not receive this signed Terms of Insurance Letter and the required payment by the expiration date, and you still require insurance, you will need to reapply for insurance, and a new quote will be issued.

The Executive Office of _____ reserves the authority to grant insurance coverage and the right to reject any and all applications but, when accepted, insurance will be made effective at 12:01 A.M. Pacific Time the day following receipt by _____ of this signed letter and your check for the deposit premium and any mandatory assessment, unless a later date is requested by you. You will receive policy documents approximately four to six weeks after policy inception. These documents will confirm the full terms and conditions of insurance. Please review them carefully.

A certificate of insurance can be issued the day your policy becomes effective if the deposit is paid with a cashier's check. If your deposit is paid with a personal/business check, a certificate of insurance will be issued when your check clears the bank.

We look forward to servicing your workers' compensation needs.

_____          _____

Travis Dilka,        Representative                                           Date

Acceptance
I accept the above terms:

_____          _____

Employer Signature                     Title                                  Date

239500BGK (NC)

What is claimed is:

1. A computer-implemented method for creating and delivering an insurance document, the method comprising the steps of:
- receiving, with a processor, a request for the insurance document from a user specifying a location and a manner for delivery of results of the request;
- acquiring, with the processor, user information for processing the request;
- extracting, with the processor, insurance data from at least one database based on the user information, the insurance data including a desired insurance coverage;
- applying, with the processor, a rule to the insurance data to determine if the insurance data violates the rule based on the desired insurance coverage;
- responsive to the insurance data violating the rule, processing, with the processor, the insurance data to comply with the rule;
- responsive to the insurance data complying with the rule, generating, with the processor, the insurance document including a quote for the desired insurance coverage; and
- transmitting, with the processor, the insurance document to the location and in the manner specified by the request.

2. The method of claim 1, wherein the insurance data includes historical losses within at least one of an industry and a geographical location.

3. The method of claim 1, wherein the extracting step further comprises generating a query; and the method further comprises:
- querying the at least one database for the insurance data.

4. The method of claim 1, wherein the step of applying further comprises determining that an insurance carrier provides the desired insurance coverage to an address provided by the user.

5. The method of claim 1, wherein the step of applying further comprises determining that an insurance carrier provides the desired insurance coverage to the user when the user is associated with a risk.

6. The method of claim 1, further comprising:
- monitoring, with the processor, a transmission of the insurance document; and
- transmitting an error message in response to a failure to deliver the insurance document.

7. The method of claim 1, wherein the step of processing the insurance data to comply with the rule further comprises at least one of filling in missing insurance data and signaling an error.

8. The method of claim 1, wherein the step of processing the insurance data to comply with the rule includes determining that an insurance company provides services to an area code associated with the user.

9. The method of claim 1, wherein the insurance document is transmitted by at least one of a fax, an email, a pager and a network.

10. The method of claim 1, wherein the request comprises a plurality of requests and the method further comprises the step of scheduling, with the processor, the plurality of requests for extracting the insurance data.

11. A system for automating assembly, processing and delivery of an insurance document, the system comprising:
- a processor;
- a first module stored on a memory, the first module receiving a request for the insurance document from a user and acquiring user information from the user including a location and a manner for delivery of results of the request;
- a second module stored on the memory and coupled to the first module, the second module receiving the user information from the first module and extracting insurance data from at least one database based on the user information, the insurance data including a desired insurance coverage;
- a third module stored on the memory and coupled to the second module, the third module receiving the insurance data, applying a rule to the insurance data to determine if the insurance data violates the rule based on the desired insurance coverage and responsive to the insurance data violating the rule, processing the insurance data to comply with the rule; and
- a fourth module stored on the memory and coupled to the third module, the fourth module receiving the processed insurance data, responsive to the insurance data complying with the rule, generating the insurance document including a quote for the desired insurance coverage and transmitting the insurance document to the location and in the manner specified by the request.

12. The system of claim 11, wherein the insurance data includes historical losses within at least one of an industry and a geographical location.

13. The system of claim 11, wherein the second module extracts insurance data by generating a query and querying the at least one database for the insurance data.

14. The system of claim 11, wherein applying of the rule includes determining that an insurance carrier provides the desired insurance coverage to an address provided by the user.

15. The system of claim 11, wherein applying of the rule includes determining that an insurance carrier provides the desired insurance coverage to the user when the user is associated with a risk.

16. The system of claim 11, wherein the fourth module monitors a transmission of the insurance document and transmits an error message in response to a failure to deliver the insurance document.

17. The system of claim 11, wherein processing the insurance data to comply with the rule includes at least one of filling in missing insurance data and signaling an error.

18. The system of claim 11, wherein processing the insurance data to comply with the rule includes determining that an insurance company provides services to an area code associated with the user.

19. The system of claim 11, wherein the insurance document is transmitted by at least one of a fax, an email, a pager and via a network.

20. The system of claim 1, wherein the request comprises a plurality of requests and the second module schedules the plurality of requests for extracting the insurance data.